United States Patent [19]

Haider et al.

[11] Patent Number: 5,510,445
[45] Date of Patent: Apr. 23, 1996

[54] PROCESS FOR CASTABLE POLYUREA ELASTOMERS

[75] Inventors: Karl W. Haider, New Martinsville; William E. Slack, Moundsville; Rick L. Adkins, New Martinsville; James W. Rosthauser, Glen Dale, all of W. Va.; Peter H. Markusch, McMurray, Pa.

[73] Assignee: Bayer Corporation, Pittsburgh, Pa.

[21] Appl. No.: 343,402

[22] Filed: Nov. 22, 1994

[51] Int. Cl.$^6$ .............................. C08G 18/32; C08G 18/50
[52] U.S. Cl. .................. 528/60; 528/64; 528/68; 528/76; 264/DIG. 77
[58] Field of Search ...................... 528/68, 76, 60, 528/64

[56] References Cited

U.S. PATENT DOCUMENTS

| | | | |
|---|---|---|---|
| 3,620,905 | 11/1971 | Ahramjian | 161/190 |
| 3,891,606 | 6/1975 | Kogon | 270/77.5 AM |
| 4,208,507 | 6/1980 | Stutz et al. | 528/64 |
| 4,569,982 | 2/1986 | Grögler et al. | 528/73 |
| 4,581,433 | 4/1986 | Potter et al. | 528/64 |
| 4,587,275 | 5/1986 | Kopp et al. | 521/163 |
| 4,927,901 | 5/1990 | Miyazaki | 528/64 |
| 5,122,547 | 6/1992 | Becker et al. | 521/159 |
| 5,364,852 | 11/1994 | Hinz et al. | 521/159 |

OTHER PUBLICATIONS

A. Awater, "PU cast elastomers" in Polyurethane Handbook, ed. G. Oertel (NY:Hanser Publishers, Apr. 1985), pp. 372–388.

J. H. Saunders & K. C. Frisch, "Urethane Elastomers" in Polyurethanes Chemistry and Technology (NY:Interscience Publishers, 1962) pp. 273–314.

*Primary Examiner*—James J. Seidleck
*Assistant Examiner*—R. F. Johnson
*Attorney, Agent, or Firm*—Joseph C. Gil; Richard E. L. Henderson

[57] ABSTRACT

This invention relates to a one-step process for preparing polyurea elastomers comprising reaction at an isocyanate index of from 90 to 200 of (a) one or more aliphatic and/or cycloaliphatic diisocyanates;

(b) 25 to 70 equivalent percent, relative to the total of components (b) and (c), of one or more liquid amine-terminated polymers containing at least two aromatically bound isocyanate-reactive primary or secondary amino groups and/or aliphatically bound isocyanate-reactive secondary amino groups and having a molecular weight of from 400 to 6000; and (c) 75 to 30 equivalent percent, relative to the total of components (b) and (c), of one or more aromatic diamine chain extenders having a molecular weight of from 108 to 399, optionally in admixture with one or more crosslinkers.

9 Claims, No Drawings

PROCESS FOR CASTABLE POLYUREA ELASTOMERS

BACKGROUND OF THE INVENTION

This invention relates to a process for the preparation of castable polyurea elastomers from aliphatic diisocyanates, amine-terminated polymers, and aromatic diamine or polyamine chain extenders in a single step.

The casting of polyurethane elastomers in open molds is known. E.g., A. Awater, "PU cast elastomers" in *Polyurethane Handbook,* ed. G. Oertel (New York: Hanser Publishers, 1985), pages 372–388; J. H. Saunders and K. C. Frisch, "Urethane Elastomers" in *Polyurethanes. Chemistry and Technology* (New York: Interscience Publishers, 1962), pages 273–314. More particularly, the casting of polyurethane elastomers from diisocyanates, polyoxyethylene polyols, and low molecular weight diols or polyols is known. For example, U.S. Pat. No. 3,620,905 discloses optically clear, light-stable polyurethanes prepared from 4,4'-methylenebis(cyclohexylisocyanate), polyethers or polyesters having a molecular weight of from 500 to 3000, and a low molecular weight diol. However, polyurethane elastomers prepared by these known methods show comparatively poor dimensional stability at elevated temperatures.

Polyurethane/polyurea hybrids based on aliphatic isocyanates and having improved high temperature stability can be cast. Such compounds are prepared in two-step processes by chain extending prepolymers of aliphatic diisocyanates and polyoxyalkylene polyols using low molecular weight diamine chain extenders such as diethyltoluenediamine (also known as "DETDA"). E.g., U.S. Pat. Nos. 4,208,507, 4,581,433, and 4,927,901. However, it is often necessary to use very specific reactive components, as well as special additives, to obtain suitable results. E.g., U.S. Pat. Nos. 3,891,606 and 4,587,275.

U.S. Pat. No. 4,569,982 discloses polyurea elastomers prepared by the reaction of aliphatic diisocyanates having melting points greater than 40° C. with aliphatic or aromatic polyamines. However, the aliphatic diisocyanates must be solid at room temperature so that the heterogeneous mixtures do not react until the diisocyanate is melted at elevated temperatures. Liquid diisocyanates are thus not suitable.

It is now been found that castable polyurea elastomers can be prepared in a one-shot process using aliphatic diisocyanates, amine-terminated polymers, and aromatic diamine or polyamine chain extenders. Elastomers prepared according to the invention exhibit improved dimensional stability at elevated temperature relative to known polyurethane elastomers based on aliphatic isocyanates. As a further advantage, it has been found that it is not necessary or even desirable to use catalysts to accelerate the polyurea-forming reaction.

SUMMARY OF THE INVENTION

This invention relates to a one-step process for preparing polyurea elastomers comprising reaction at an isocyanate index of from about 90 to about 200 of (a) one or more aliphatic and/or cycloaliphatic diisocyanates;

(b) about 25 to about 70 equivalent percent (preferably 30 to 50 equivalent percent), relative to the total of components (b) and (c), of one or more liquid amine-terminated polymers containing at least two aromatically bound isocyanate-reactive primary or secondary (preferably primary) amino groups and/or aliphatically bound isocyanate-reactive secondary amino groups and having a molecular weight of from 400 to about 6000; and (c) about 75 to about 30 equivalent percent (preferably 70 to 50 equivalent percent), relative to the total of components (b) and (c), of one or more aromatic diamine chain extenders having a molecular weight of from 108 to 399, optionally in admixture with one or more crosslinkers (preferably no more than 10 mole-% crosslinker relative to the aromatic diamine chain extender).

DETAILED DESCRIPTION OF THE INVENTION

Suitable diisocyanates (a) include aliphatic and/or cycloaliphatic diisocyanates of the type described, for example, by W. Siefken in *Justus Liebigs Annalen der Chermie,* 562, pages 75 to 136. Such isocyanates include those having the formula

$Q(NCO)_2$ in which Q is an aliphatic hydrocarbon group containing 2 to about 18 (preferably 6 to 10) carbon atoms, an araliphatic hydrocarbon group containing 8 to 15 (preferably 8 to 13) carbon atoms, or a cycloaliphatic hydrocarbon group containing 4 to about 15 (preferably 10 to 15) carbon atoms. Examples of suitable diisocyanates include ethylene diisocyanate; 1,4-tetramethylene diisocyanate; 1,6-hexamethylene diisocyanate; 1,12-dodecamethylene diisocyanate; cyclobutane-1,3-diisocyanate; cyclohexane- 1,3- and -1,4-diisocyanate, and mixtures of these isomers; 1-isocyanato-2-isocyanatomethylcyclopentane; 1-isocyanato-1-methyl-3- and/or - 4-isocyanatomethylcyclohexane ("IMCI"); 1,3- and 1,4-bis(isocyanatomethyl)cyclohexane; 1-isocyanato-3,3,5-trimethyl-5-isocyanatomethylcyclohexane ("isophorone diisocyanate"; see, e.g., German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate ("hydrogenated MDI", or "HMDI"), including the t,t-, c,t-, and c,c-isomers and mixtures thereof; dicyclohexylmethane- 2,4'-diisocyanate; methyl or ethyl (S)-2,6-diisocyanatohexanoate ("lysine diisocyanate"); dimeryl diisocyanate; $\alpha,\alpha,\alpha',\alpha'$-tetramethyl-1,3- and/or -1,4-xylylene diisocyanate ("TMXDI"); and norbornane diisocyanates, such as described in U.S. Pat. No. 3,492,330. Suitable aliphatic, araliphatic, and/or cycloaliphatic diisocyanates also include modified diisocyanates containing carbodiimide groups of the type described in U.S. Pat. No. 3,152,162; modified diisocyanates containing urethane groups of the type described, for example, in U.S. Pat. Nos. 3,394,164 and 3,644,457; modified diisocyanates containing allophanate groups of the type described, for example, in British Patent 994,890, Belgian Patent 761,616, and published Dutch Patent Application 7,102,524; modified diisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified diisocyanates containing urea groups of the type described in German Patentschrift 1,230,778; diisocyanates containing biuret groups of the type described, for example, in German Patentschrift 1,101,394, U.S. Pat. Nos. 3,124,605 and 3,201,372, and in British Patent 889,050; diisocyanates obtained by telomerization reactions of the type described, for example, in U.S. Pat. No. 3,654,106; diisocyanates containing ester groups of the type described, for example, in British Patents 965,474 and 1,072,956, in U.S. Pat. No. 3,567,763, and in German Patentschrift 1,231,688; reaction products of the above-mentioned diisocyanates with acetals as described in German Patentschrift 1,072,385; and diisocyanates containing polymeric fatty acid groups of the type described in U.S. Pat. No. 3,455,883. It is also possible to use the isocyanate-containing distillation residues accumulating in the production of diisocyanates on a commercial scale, optionally in solution in one or more of the diisocyanates mentioned above. It is also possible to use mixtures of such diisocyanates.

In general, it is preferred to use readily available diisocyanates, such as hexamethylene diisocyanate, 1-isocyanato-3,3,5-trimethyl-5-isocyanatomethylcyclohexane, and a mixture of the geometric isomers of dicyclohexylmethane-4,4'-diisocyanate; and diisocyanates containing carbodiimide groups, urethane groups, allophanate groups, isocyanurate groups, urea groups, or biuret groups ("modified diisocyanates").

Suitable polyisocyanates also include isocyanate-terminated prepolymers prepared by reaction of any of the above polyisocyanates with a substoichiometric amount of an isocyanate-reactive compound, such as hydroxyl- or amino-containing compounds known in the art. Blends of any of the previously disclosed polyisocyanates may also be used in accordance with the present invention.

Suitable liquid amine-terminated polymers (b) according to the invention include polymers containing at least two aromatically bound isocyanate-reactive primary or secondary (preferably primary) amino groups and/or aliphatically bound isocyanate-reactive secondary amino groups and having a molecular weight of from 400 to about 6000. Preferred amine-terminated polymers contain about 2 to about 8 (more preferably 2 to 4, most preferably 2) amino groups and have a molecular weight of from 400 to 4000 (most preferably 1000 to 3000). Compounds containing amino end groups can also be attached to the polymer chain through urethane or ester groups. The preferred liquid amine-terminated polymers are liquids at room temperature and have viscosities of less than about 20,000 mPa.s at 25° C. Although solid or higher-viscosity liquid amine-terminated polymers are not themselves suitable, mixtures of amine-terminated polymers containing one or more solid and/or higher-viscosity liquid amine-terminated polymers may be suitable if the mixtures are liquids having appropriate viscosities.

Particularly preferred liquid amine-terminated polymers are amine-terminated polyethers. Suitable amine-terminated polyethers can be prepared by any of several methods known in the art. Suitable amine-terminated polyethers can be obtained by the hydrolysis of various polymers containing isocyanate end groups. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine-terminated polyethers are prepared by hydrolyzing an isocyanate compound having an isocyanate group content of from 0.5 to 40% by weight. Suitable polyethers can be prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595.

Other suitable amine-terminated polyethers include aminophenoxy-substituted polyethers described, for example, in European Patent Applications 288,825 and 268,849. Aminophenoxy-substituted polyethers can also be prepared, for example, by converting polyether polyols into nitrophenoxy-terminated polyethers (by reaction, for example, with chloronitrobenzenes), followed by hydrogenation. E.g., U.S. Pat. Nos. 5,079,225 and 5,091,582. In a preferred method, aminophenoxy-substituted polyethers are prepared by converting polyether polyols into the corresponding sulfonate derivatives, followed by reaction of the polyether sulfonate with an aminophenoxide.

Suitable amine-terminated polyethers also include aliphatic amine-terminated polyethers prepared by the mesylate method described, for example, in U.S. application Ser. No. 07/957,929 (filed Oct. 7, 1992). In a preferred method, polyether polyols are converted into corresponding derivatives having suitable leaving groups (such as halide or sulfonate groups) that in turn react with primary amines to form secondary amine-terminated polyethers.

Other suitable amine-terminated polyethers include aminobenzoic acid esters of polyether polyols described, for example, in U.S. Pat. No. 5,219,973. These aminobenzoate derivatives are prepared by reaction of polyether polyols with meta-nitrobenzoic acid or, preferably, meta-nitrobenzoyl chloride to form corresponding nitrobenzoic acid esters that are then hydrogenated to the amines.

Although generally less preferred, suitable amine-terminated polyethers also include certain aminocrotonate-terminated derivatives of polyethers prepared from acetoacetate-modified polyethers as described, for example, in U.S. Pat. Nos. 5,066,824, 5,151,470, and 5,231,217.

Amine-terminated polyethers prepared from polyhydroxyl polyethers (e.g., polypropylene glycol ethers) by reaction with ammonia or by hydrogenation of cyanoethylated polyoxypropylene ethers are typically too reactive to be suitable for the process of the present invention. On the other hand, anthranilic acid esters of relatively high molecular weight polyhydroxy-polyethers (i.e., those based on isatoic acid) are generally unsuitable because they are too unreactive and thus allow selective reaction of the diisocyanate with the chain extender.

It is also possible, although much less preferred, to use amine-terminated polyesters, polyacetals, polycarbonates, polyesterethers, polyester carbonates, polythioethers, polyamides, polyesteramides, polysiloxanes, polybutadienes, polyacetones. Mixtures of such polymers are, of course, also suitable.

Although generally not preferred, the amine-terminated polymers used in the present invention can be used in admixture with smaller quantities (preferably no more than 30 mole-% relative to the amine-terminated polymers) of other known isocyanate-reactive compounds, such as hydroxyl-containing polyethers, polyesters, polyacetals, polycarbonates, polyesterethers, polyester carbonates, polythioethers, polyamicles, polyesteramides, polysiloxanes, polybutadienes, and polyacetones (particularly polyether polyols). These mixtures generally should contain (on a statistical average) two to three isocyanate-reactive end groups.

Suitable aromatic diamine chain extenders (c) include compounds having two isocyanate-reactive amino groups and having a molecular weight of from 108 to 399. The preferred amine chain extenders contain exclusively aromatically bound primary or secondary (preferably primary) amino groups and preferably also contain alkyl substituents. Examples of such diamines include 1,4-diaminobenzene, 2,4-diaminotoluene, 2,4'- and/or 4,4'-diaminodiphenylmethane, 3,3'-dimethyl-4,4'-diaminodiphenylmethane, 3,3'-dichloro-4,4'-diaminodiphenylmethane ("MOCA"), 1-methyl- 3,5-bis(methylthio)-2,4- and/or-2,6-diaminobenzene, 1,3,5-triethyl-2,4-diaminobenzene, 1,3,5-triisopropyl-2,4-diaminobenzene, 1-methyl-3,5-diethyl- 2,4- and/or-2,6-diaminobenzene (also known as 3,5-diethyl-2,4- and/or-2,6-toluenediamine, or "DETDA"), 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, and 3,5-diethyl- 3',5'-diisopropyl-4,4'-diaminodiphenylmethane. Such diamines may, of course, also be used as mixtures. It is particularly preferred to use 1-methyl-3,5-diethyl- 2,4-diaminobenzene or a mixture thereof with 1-methyl-3,5-diethyl- 2,6-diaminobenzene.

The aromatic diamine chain extenders used in the present invention can, less preferably, also be used in admixture with smaller quantities (preferably no more than 25 mole-% relative to the aromatic diamine chain extenders) of glycol and/or polyamine chain extenders, including glycols and polyols such as 1,2-ethanediol, 1,2- and 1,3-propylene glycol, 1,4- and 2,3-butylene glycol, 1,6-hexanediol, 1,8-octanediol, neopentyl glycol, cyclohexanedimethanol, 1-methyl-1,3-propanediol, 2-methyl-1,3-propanediol, ethanolamine, diethanolamine, N-methylethanolamine, N-ethylethanolamine, N-methyldiethanolamine, and N-ethyldiethanolamine. Although generally less preferred, it is also possible to use amine-terminated polyethers of appropriate molecular weight, such as low molecular weight aminocrotonate-terminated polyethers prepared from acetoacetate-modified polyethers as described, for example, in U.S. Pat. Nos. 5,066,824, 5,151,470, and 5,231,217.

It is also possible, but much less preferred, to include small quantities (preferably no more than 10 mole-% relative to the aromatic diamine chain extenders) of one or more crosslinkers, which are distinguished from chain extenders by having a functionality greater than two. Suitable crosslinkers are isocyanate-reactive compounds having three or more isocyanate-reactive hydroxyl, amino, and/or thiol groups (preferably hydroxyl and/or amino groups) and having a molecular weight of about 89 to about 399. Examples include glycerol, trimethylolpropane, 1,2,6-hexanetriol, 1,2,4-butanetriol, trimethylolethane, triethanolamine, tris(2-aminoethyl)amine, as well as alcohol- or amine-started polyether triols and tetraols prepared as described above but having a molecular weight of only about 90 to about 350.

Catalysts, although not preferred (or even desirable), may be included in the process of the invention. Suitable catalysts include tertiary amines such as triethylamine, tributylamine, N-methylmorpholine, Nethylmorpholine, N,N,N',N'-tetramethylethylene diamine, pentamethyldiethylene triamine, and higher homologs (German Offenlegungsschrifien 2,624,527 and 2,624,528), 1,4-diazabicyclo[2.2.2]octane, N-methyl-N'-(dimethylaminoethyl)piperazine, bis(dimethylaminoalkyl)piperazines (German Offenlegungsschrift 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methylimidazole, monocyclic and bicyclic amidines (German Offenlegungsschrift 1,720,633), bis(dialkylamino)alkyl ethers (U.S. Pat. No. 3,330,782, German Auslegeschrift 030,558, and German Offenlegungsschriften 1,804,361 and 2,618,280), and tertiary amines containing amide groups (preferably formamide groups) according to German Offenlegungsschrifien 2,523,633 and 2,732,292. The catalysts used may also be the known Mannich bases of secondary amines (such as dimethylamine) and aldehydes (preferably formaldehyde) or ketones (such as acetone) and phenols.

Sila-amines containing carbon-silicon bonds may also be used as catalysts, for example, those described in German Patentschrift 1,229,290 (corresponding to U.S. Pat. No. 3,620,984). Examples of suitable sila-amines include 2,2,4-trimethyl-2-silamorpholine and 1,3-dimethylaminomethyl tetramethyldisiloxane.

Suitable catalysts also include nitrogen-containing bases, such as tetraalkylammonium hydroxides; alkali metal hydroxides, such as sodium hydroxide; alkali metal phenolates, such as sodium phenolate; and alkali metal alcoholates, such as sodium methoxide. Hexahydrotriazines (German Offenlegungsschrift 1,709,043) and tertiary amines containing amide groups (preferably formamide groups) (German Offenlegungsschriften 2,523,633 and 2,732,292) may also be used as catalysts. Known Mannich bases of secondary amines (such as dimethylamine) and aldehydes (preferably formaldehyde) or ketones (such as acetone) and phenols may also be used as catalysts.

In general, amine catalysts are more effective with aromatic isocyanates than with the (cyclo)aliphatic isocyanates used in the present invention.

Suitable catalysts also include organic metal compounds, especially organic tin and bismuth compounds. Suitable organic tin compounds include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art.

Any of the above-mentioned catalysts may, of course, be used as mixtures.

Further representatives of catalysts to be used according to the invention and details concerning their mode of action are described in Kunststoff Handbuch, Volume VII, published by Vieweg and Hüchtlen, Carl Hanser Verlag, Munich, 1966, for example, on pages 96 to 102.

The catalysts, if used at all, can be used in a quantity ranging from about 0.002 to about 1% by weight, based on the total quantity of components (a), (b), and (c).

Auxiliary agents and additives may optionally also be used in the process of the invention. Suitable auxiliary agents and additives may include, for example, internal mold release agents, blowing agents, surface-active additives, cell regulators, pigments, dyes, UV stabilizers, plasticizers, fungistatic or bacteriostatic substances, and fillers, such as those described in European Patent Application 81,701 at column 6, line 40, to column 9, line 31. When used, the preferred auxiliary agents and additives include known fillers and/or reinforcing substances, such as barium sulfate, calcium carbonate, talc, hydrated alumina, clay, kieselguhr, whiting, mica, and especially glass fibers, liquid crystal fibers, glass flakes, glass balls, aramide fibers, and carbon fibers. These fillers and/or reinforcing materials may be added in quantities of up to 70% by weight based on the total quantity of filled or reinforced polyurea.

The polyureas of the present invention may be prepared by introducing starting materials or mixtures thereof into a suitable mold using known one-stage processes. Machines suitable for the process are described, for example, by J. K. Rogers, *Plastics Technology*, 66, 50–58 (1989). See also G. R. Smoluk, *Modern Plastics*, 35, 57–65 (January, 1989), and R. V. Wilder, *Modern Plastics*, 66, 48–50 (July, 1989).

In the one-stage (or "one-shot") method, the isocyanate-reactive components (b) and (c), as well as any catalysts, additives, and auxiliaries, are typically combined and thoroughly blended in a premix. The diisocyanate is then mixed with the premix in an appropriate open mold or molding machine. External release agents, such as silicone oils, are often used during the molding process. It is, however, also possible to use so-called "internal release agents", optionally in admixture with external release agents, as described, for example, in German Oftenlegungsschriften 2,121,670 and 2,307,589. The reactants are used in quantities such that the isocyanate index is from about 90 to about 200 (preferably 95 to 150 and more preferably 98 to 110). By "isocyanate index" is meant the quotient of the number of isocyanate groups divided by the number of isocyanate-reactive groups, multiplied by 100.

The polyureas of the invention are preferably prepared by casting into a suitable open mold. The temperature at which the polyureas of the invention are prepared is generally not critical but the mold temperature is preferably about 60° C. to about 120° C.

It is also possible, although generally less preferred, to prepare the polyureas of the invention by the known resin transfer molding ("RTM") technique or, when using the more rapidly reacting starting materials, the known reaction injection molding ("RIM") technique.

The polyureas prepared according to the invention can be used, for example, as elastomers having improved high temperature performance (such as conveyor belts, V-belts, rollers, and the like) binders for aggregates, adhesives having good stability at elevated temperatures, and encapsulants for electrical components.

The following examples further illustrate details for the process of this invention. The invention, which is set forth in the foregoing disclosure, is not to be limited either in spirit or scope by-these examples. Those skilled in the art will readily understand that known variations of the conditions of the following procedures can be used. Unless otherwise noted, all temperatures are degrees Celsius and all percentages are percentages by weight.

EXAMPLES

The physical properties of the polyureas of the invention and the comparative polyurethanes and polyurethane-polyureas were determined by methods known in the art. Estimate of the maximum use temperatures were determined by thermal mechanical analysis ("TMA") and dynamic mechanical analysis ("DMA").

Thermal mechanical analysis

Softening points were determined by thermal mechanical analysis using a Perkin Elmer Model TMA 7 thermal mechanical analyzer. The sample temperature was initially 25° C. During analysis the temperature was increased at a rate of 10° C./min to 220° C. The force of the DMA probe was 300 mN.

Dynamic mechanical analysis

Dynamic mechanical analyses were performed using a Rheometrics RDA-II dynamic mechanical spectrometer in rectangular torsion mode. The samples were subjected to an oscillatory strain at a frequency of 1 Hz. The samples were heated from −80° C. to 220° C. in a stepwise manner at 5° C. increments and were allowed to equilibrate for two minutes at each temperature before measurements were taken. The autostrain and autotension features of the instrument were used. The initial commanded strain was 0.04% and the maximum strain reached during each test was 2%.

Examples 1–3

Examples 1–3 describe the preparation of a series of amine-terminated polyethers used as starting materials in Examples 4–9.

Example 1

Mesylate preparation (general procedure)

A polypropylene oxide diol having a molecular weight of 2000 (312 g; 0.312 eq.) (available as MULTRANOL® 3600 from Miles), triethylamine (31.57 g; 0.350 mol), and 60 mL of dichloromethane were added to a flask fitted with a stirrer and reflux condenser (under nitrogen). Methanesulfonyl chloride (40.09 g; 0.350 mol) was added dropwise while maintaining the solution temperature at 25° C. with an ice water bath. The reaction solution was stirred at room temperature for thirty minutes, then neutralized with sodium hydroxide (28 g of a 50% solution; 0.350 mol). Volatiles were removed under vacuum and the resultant product was filtered to give a clear, colorless liquid.

This procedure was also use to prepare mesylates based on a polypropylene oxide diol having a molecular weight of 1000 (available as MULTRANOL® E-9109 from Miles) and a polytetramethylene-glycol-based diol having a molecular weight of 2000 (available as POLYMEG® 2000 from Quaker Oats).

Example 2

Preparation of amine-terminated polyethers from mesylates

Example 2a (general procedure)

The mesylate prepared according to Example 1 from a polypropylene oxide diol having a molecular weight of 2000 (1801.9 g; 1.67 eq) was added to a flask fitted with a stirrer and reflux condenser (under nitrogen). 2-Ethylhexylamine (1402.4 g; 10.85 mol) was added and the solution was heated at 150° C. for nine hours. The solution was then cooled and neutralized with sodium hydroxide (133.6 g of a 50% solution; 1.67 mol). Excess amine and water were removed under vacuum and the product was filtered to give a clear, light yellow liquid having a viscosity of 256 mPa.s and an amine number of 47.2. The conversion was 93.7% based on the amine number. Physical properties (as well as reaction parameters) are listed in Table 1.

Examples 2b–2d

The procedure of Example 2a was used to prepare other amine-terminated polyethers. In particular, the amine-terminated polyethers of Examples 2b and 2c were prepared from a mesylate based on a polypropylene oxide diol having a molecular weight of 1000 (with Example 2c using aniline instead of 2-ethylhexylamine) and the amine-terminated polyether of Example 2d was prepared from a mesylate based on a polytetramethylene-glycol-based diol having a molecular weight of 2000. Reaction parameters and physical properties are listed in Table 1.

TABLE 1

Amine-terminated polyethers of Examples 2a to 2d

| | Example | | | |
|---|---|---|---|---|
| | 2a | 2b | 2c | 2d |
| Polyether polyol starting material | Polypropylene oxide diol (MW 2000) | Polypropylene oxide diol (MW 1000) | Polypropylene oxide diol (MW 1000) | Polytetramethylene-glycol-based diol (MW 2000) |
| Amine | 2-Ethylhexylamine | 2-Ethylhexylamine | Aniline | 2-Ethylhexylamine |
| Mesylate/amine (molar ratio) | 6.5:1 | 6:1 | 3:1 | 3:1 |
| Reaction conditions | | | | |
| Temperature (°C.) | 150 | 150 | 150 | 150 |
| Time (hr) | 9 | 9 | 5 | 2 |
| Physical properties | | | | |
| Viscosity (mPa · s, 25° C.) | 256 | 105 | 450 | solid |
| Amine number | 47.2 | 83.0 | 89.7 | 43.6 |
| Conversion (%)[(1)] | 93.7 | 90.4 | 94.7 | 86.5 |

[(1)]Conversion is based on amine number of the amine-terminated polyether product and the hydroxyl number of the starting polyether polyol.

Example 3

Preparation of 2-aminophenoxy-terminated polypropylene glycol

The mesylate prepared according to Example 1 from a polypropylene oxide diol having a molecular weight of 2000 (1820 g, 1.686 eq.), 1-methyl-2-pyrrolidinone (1.7 L), and 2-aminophenol (193.2 g, 1.77 mol) were placed in a flask under nitrogen and stirred until dissolved. To this solution was added 50% aqueous sodium hydroxide (283.2 g, 3.54 mol) and the resultant solution was stirred for 20 minutes and then held at 60° C. for six hours. The crude product was slowly heated to 150° C. under vacuum (ca. 0.05 mm Hg) to remove solvent and water. After cooling, the solution was diluted with toluene and filtered. The toluene was removed under vacuum and the remaining material was passed through a thin film evaporator at 200° C. (0.2 mm Hg) to remove residual solvent and 2-aminophenol. The 2-aminophenoxy-terminated polypropylene glycol was obtained as a dark liquid having a viscosity of 1030 mPa.s at 25° C. and an amine number of 49.0 (95.5% conversion).

Example 4

Preparation of polyureas according to the invention

Example 4a (general procedure)

To liquid dicyclohexylmethane-4,4'-diisocyanate (49.5 g; 0.377 eq.) (available as DESMODUR® W from Miles Inc.) was added in sequence at room temperature the amine-terminated polyether of Example 2a (128.12 g; 0.108 eq.) and diethyltoluenediamine (22.38 g; 0.251 eq.) (available as BAYTEC® E-505 from Miles Inc.). The mixture was stirred for 30 seconds, degassed in vacuo, and poured into a preheated mold (110° C.). The sample was cured in the mold at 110° C. for 16 hours, then removed from the mold and post-cured overnight at 110° C. Physical properties of the resultant polyurea were determined after aging the molded part for a minimum of two weeks.

Examples 4b–4h

The procedure of Example 4a was used to prepare other polyureas according to the invention as shown in Table 2.

Physical properties of the resulting polymers of Examples 4a–4h are shown in Table 4.

TABLE 2

Polyureas of Examples 4a to 4h

| | Example | | | | | | | |
|---|---|---|---|---|---|---|---|---|
| | 4a | 4b | 4c | 4d | 4e | 4f | 4g | 4h |
| Amine-terminated polyether (Ex. no.) | Ex. 2a | Ex. 2a | Ex. 2a | Ex. 2a | Ex. 2b | Ex. 2b | Ex. 3 | Ex. 3 |
| [g (meq)] | 128.12 g 108 meq | 142.65 g 120 meq | 142.6 g 120 meq | 151.6 g 128 meq | 115.52 g 171 meq | 99.06 g 147 meq | 139.69 g 122 meq | 126.38 g 110 meq |
| Diethyltoluene-diamine [g (meq)] | 22.38 g 251 meq | 16.02 g 180 meq | 21.36 g 240 meq | 11.35 g 128 meq | 22.82 g 256 meq | 30.44 g 342 meq | 16.29 g 183 meq | 22.92 g 258 meq |
| Dicyclohexyl-methane-4,4'-diisocyanate | 49.5 g 377 meq | 41.33 g 315 meq | 52.27 g 396 meq | 37.08 g 280 meq | 61.66 g 470 meq | 70.50 g 537 meq | 44.02 g 336 meq | 50.69 g 386 meq |

TABLE 2-continued

Polyureas of Examples 4a to 4h

| | Example | | | | | | | |
|---|---|---|---|---|---|---|---|---|
| | 4a | 4b | 4c | 4d | 4e | 4f | 4g | 4h |
| [g (meq)] Pot life (min) | 5 | 5.5 | 7 | 10 | 5 | 3 | 7 | 5.5 |

Example 5

Preparation of comparative polyurethanes

Example 5a (general procedure)

To liquid dicyclohexylmethane-4,4'-diisocyanate (87.09 g; 0.663 eq.) was added in sequence at room temperature a polypropylene oxide diol having a molecular weight of a 2000 (237.9 g; 0.238 eq.) and 1,4-butanediol (17.98 g; 0.400 eq.). The reaction mixture was heated with stirring in vacuo to 60° C. until the reaction mixture became homogenous, as evidenced by a clear solution. After the mixture was cooled to 45° C., a 1% solution of dibutyltin dilaurate in the same polypropylene oxide diol (7.0 g) was added to the stirred reaction mixture. The mixture was briefly degassed (30 seconds) then cast in preheated molds (120° C.). The parts were removed from the mold after 1.5 hours, then post-cured at 120° C. for an additional 16 hours. Physical properties of the resultant polyurethane were determined after aging the parts for a minimum of two weeks.

Examples 5b and 5c

The procedure of Example 5a was used to prepare other comparative polyurethanes as shown in Table 3.

Physical properties of the comparative polyurethanes of Examples 5a–5c are shown in Table 4.

The softening points of the polyureas of Examples 4a–4h according to the invention were dramatically higher than the softening points of the comparative polyurethanes of Examples 5a–5c. In addition, dynamic mechanical analysis showed that the rubbery plateau regions of the polyureas of Examples 4c and 4d extended to higher maximum temperatures (represented by $T_f$ in Table 4) than the rubbery plateaus regions of the comparative polyurethane of Example 5a.

TABLE 3

Comparative polyrethanes of Examples 5a to 5c

| | Example | | |
|---|---|---|---|
| | 5a | 5b | 5c |
| Polyether polyol [g (meq)] | 237.9 g 238 meq | 202.7 g 203 meq | 167.8 g 168 meq |
| 1,4-Butanediol [g (meq)] | 17.98 g 400 meq | 27.97 g 622 meq | 37.88 g 842 meq |
| Dicyclohexylmethane-4,4'-diisocyanate [g (meq)] | 87.09 g 663 meq | 112.32 g 856 meq | 137.35 g 1047 meq |
| Temperature (°C.) | 60 | 60 | 85 |

TABLE 4

Physical properties of polyureas of Example 4 and of polyurethanes of comparative Example 5

| | Example | | | | | | | | | | |
|---|---|---|---|---|---|---|---|---|---|---|---|
| | 4a | 4b | 4c | 4d | 4e | 4f | 4g | 4h | 5a | 5b | 5c |
| Hardness | | | | | | | | | | | |
| Shore A | 96 | 85 | — | — | — | — | 93 | 95 | 58 | 74 | 84 |
| Shore D | 47 | — | — | — | 53 | 67 | 45 | 47 | — | — | — |
| Tensile str. (MPa) | 20.2 | 11.2 | — | — | 17.3 | 24.5 | 10.1 | 16.5 | 4.5 | 8.9 | 14.7 |
| Tensile modulus | | | | | | | | | | | |
| 100% (MPa) | 9.3 | 4.4 | — | — | 12.4 | 22.6 | 9.2 | 12.0 | 2.2 | 5.3 | 9.5 |
| 300% (MPa) | 15.8 | 7.3 | — | — | — | — | — | — | 4.2 | 8.6 | — |
| Elongation (%) | 402 | 549 | — | — | 197 | 138 | 116 | 214 | 750 | 367 | 275 |
| Bayshore rebound (%) | 51 | 44 | — | — | 44 | 48 | 50 | 48 | 48 | 42 | 42 |
| Softening point (°C.) | 193 | 170 | 178 | 142 | 190 | 211 | 172 | 171 | 85 | 84 | 96 |
| DMA results[1] | | | | | | | | | | | |
| $T_i$ (°C.) | — | — | 18 | 18 | — | — | — | — | 5 | — | — |
| $T_f$ (°C.) | — | — | 133 | 139 | — | — | — | — | 55 | — | — |

[1]$T_i$ refers to the initial temperature and $T_f$ refers to the final temperature of the rubbery plateau region.

Examples 6–8 Preparation of comparative polyureas

Example 6 (comparison)

To liquid dicyclohexylmethane-4,4'-diisocyanate (6.44 g; 0.0491 eq.) was added in sequence at room temperature the amine-terminated polyether of Example 2c (11.17 g; 0.0179 eq.) and diethyltoluenediamine (2.38 g; 0.0268 eq.) (available as BAYTEC® E-505 from Miles Inc.). The mixture was stirred for 30 seconds and degassed in vacuo. The sample was placed in an oven to cure at 110° C. Within minutes, the reaction mixture became heterogeneous, with a solid forming and separating from the mixture. Even after 24 hours in the oven, the sample remained tacky and did not develop properties consistent with a high molecular weight polyurea.

Example 7 (comparison)

To liquid dicyclohexylmethane-4,4'-diisocyanate (2.31 g; 0.0177 eq.) was added in sequence at room temperature a commercially available difunctional amine-terminated polypropylene oxide having a molecular weight of 2000 (JEFFAMINE® D-2000, available from Texaco) (8.41 g; 0.00841 eq.) and diethyltoluenediamine (0.75 g; 0.00843 eq.) (available as BAYTEC® E-505 from Miles Inc.). Upon stirring, the mixture rapidly increased in viscosity and became too viscous to pour before thorough mixing could be achieved (i.e., within 30 seconds).

Comparative Examples 6 and 7 illustrate the importance of amine-terminated polyethers having appropriate reactivities. The reactivity to isocyanate groups of the amine-terminated polyether of comparative Example 6 is lower than the reactivity of the chain extender, whereas the reactivity of the amine-terminated polyether of comparative Example 7 is too fast to permit thorough hand-mixing of the reactants.

Example 8 (comparison)

To liquid dicyclohexylmethane-4,4'-diisocyanate (3.74 g; 0.0285 eq.) was added in sequence at room temperature the amine-terminated polyether of Example 2d (14.99 g; 0.0117 eq.) and diethyltoluenediamine (1.27 g; 0.0142 eq.) (available as BAYTEC® E-505 from Miles Inc.). The mixture was stirred for 30 seconds. Within this time the reaction mixture became too viscous to degas or pour into a mold.

Comparative Example 8 illustrates the importance of the viscosity of the reactants. In particular, comparative Example 8 shows that solid amine-terminated polyethers are not suitable for preparing cast polyureas based on aliphatic diisocyanates.

In contrast, a mixture of amine-terminated polyethers 2a and 2d (10 g each; total 0.0162 meq), which is liquid at room temperature (viscosity 1030 mPa.s at 27° C.), gave a castable system having a pot life of about 5 minutes when used with dicyclohexylmethane-4,4'-diisocyanate 5.57 g; 0.0425 eq.) and diethyltoluenediamine (2.16 g; 0.0243 eq.). When removed from the mold after about 20 minutes, the product showed no evidence of inhomogeneity.

Example 9 Preparation of comparative polyurethane-polyurea

To liquid dicyclohexylmethane-4,4'-diisocyanate (33.12 g; 0.252 eq.) was added in sequence at room temperature a polypropylene oxide diol having a molecular weight of 2000 (160.77 g; 0.161 eq.) and diethyltoluenediamine (6.11 g; 0.0686 eq.) (available as BAYTEC® E-505 from Miles Inc.). The mixture was briefly degassed (30 seconds), during which process the mixture turned cloudy and formed a precipitate. The resultant slurry was poured into a preheated mold (110° C.) and cured in the mold for 16 hours. The resultant polyurethane/polyurea was sticky, had poor integrity, and could not be removed from the mold without being destroyed.

Comparative Example 9 shows that polyurethane/polyureas cannot be cast by a one-shot reaction of dicyclohexylmethane-4,4'-diisocyanate with conventional polyether polyols and diethyltoluenediamine.

What is claimed is:

1. A one-step process for preparing polyurea cast elastomers comprising reaction in an open mold at an isocyanate index of from 90 to 200 of
   (a) one or more aliphatic and/or cycloaliphatic diisocyanates;
   (b) 25 to 70 equivalent percent, relative to the total of components (b) and (c), of one or more liquid amine-terminated polymers containing at least two aromatically bound isocyanate-reactive primary amino groups and/or aliphatically bound isocyanate-reactive secondary amino groups as the only isocyanate reactive groups and having a molecular weight of from 400 to 6000; and
   (c) 75 to 30 equivalent percent, relative to the total of components (b) and (c), of one or more aromatic diamine chain extenders having a molecular weight of from 108 to 399, optionally in admixture with one or more crosslinkers.

2. A process according to claim 1 wherein 30 to 50 equivalent percent, relative to the total of components (b) and (c), of one or more liquid amine-terminated polymers and 70 to 50 equivalent percent, relative to the total of components (b) and (c), of one or more aromatic diamine chain extenders are used.

3. A process according to claim 1 wherein the liquid amine-terminated polymer is an amine-terminated polyether.

4. A process according to claim 1 wherein the liquid amine-terminated polymer is a liquid at room temperature and has a viscosity of less than 20,000 mPa.s at 25° C.

5. A process according to claim 1 wherein the aromatic diamine chain extender is 3,5-diethyl-2,4-toluenediamine and/or 3,5-diethyl-2,6-toluenediamine.

6. A process according to claim 1 wherein the aromatic diamine chain extender is used in admixture with no more than 10 mole-%, relative to the aromatic diamine chain extender, of a crosslinker.

7. A process according to claim 1 wherein cycloaliphatic diisocyanate (a) is a mixture of the geometric isomers of dicyclohexylmethane- 4,4'-diisocyanate.

8. A polyurea elastomer prepared by the process of claim 1.

9. A process according to claim 1 wherein the liquid amine-terminated polymer is used in admixture with no more than 30 mole-%, relative to the amine-terminated polymer, of a different isocyanate-reactive compound selected from the group consisting of hydroxyl-containing polyethers, polyesters, polyacetals, polycarbonates, polyesterethers, polyester carbonates, polythioethers, polyamides, polyesteramides, polysiloxanes, polybutadienes, and polyacetones.

* * * * *